Jan. 12, 1954     E. R. GUMM     2,665,994
ADJUSTABLE CULTIVATOR SHIELD
Filed May 5, 1949
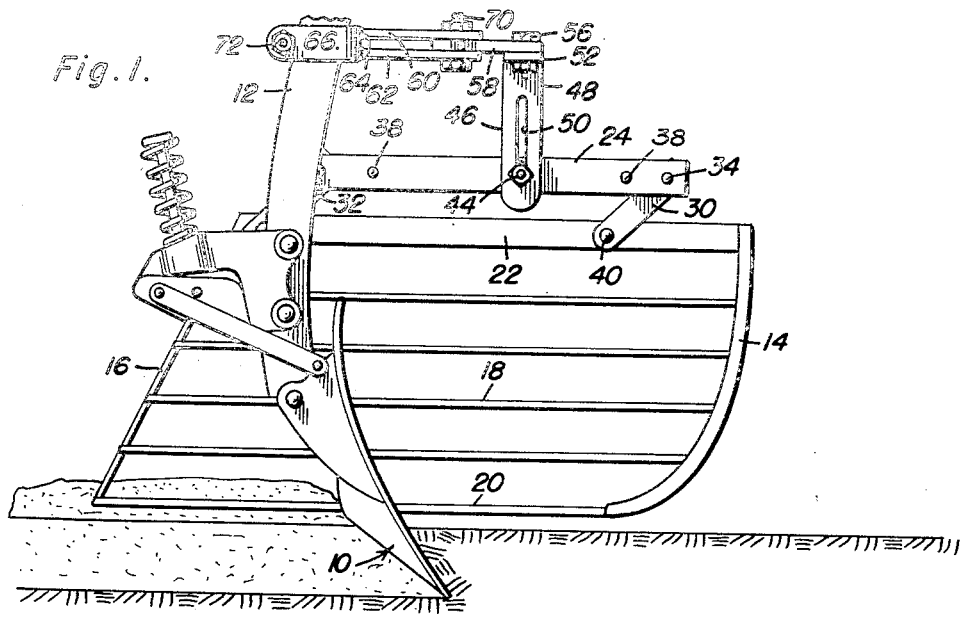
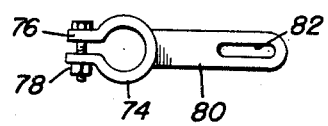
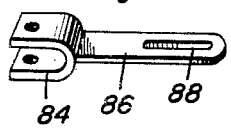
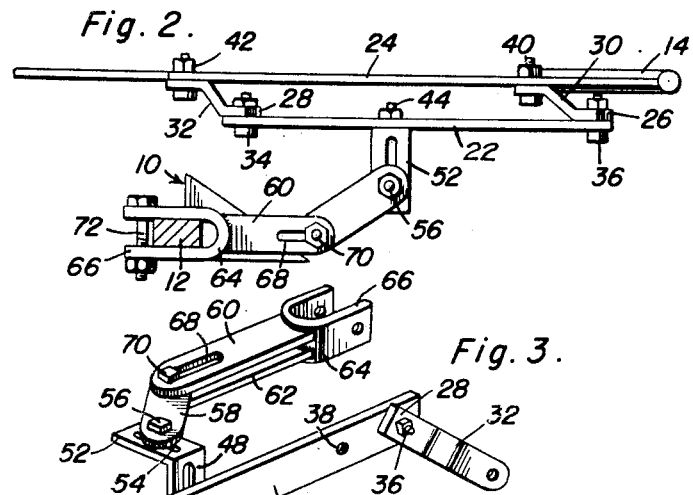
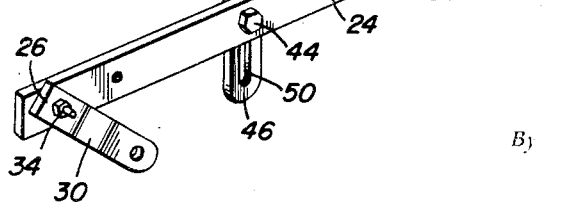
Inventor
Earnest R. Gumm
By Clarence A. O'Brien
and Harvey B. Jacobson
*Attorneys*

Patented Jan. 12, 1954

2,665,994

UNITED STATES PATENT OFFICE 2,665,994

ADJUSTABLE CULTIVATOR SHIELD

Earnest R. Gumm, Cooper, Iowa

Application May 5, 1949, Serial No. 91,492

3 Claims. (Cl. 97—188)

This invention relates to new and useful improvements in agricultural implements and the primary object of the present invention is to provide a cultivator shield including a grid member that is mounted adjacent a cultivator shovel to screen dirt directed from the cultivator shovel.

Another very important object of the present invention is to provide a cultivator shield including a grid member and embodying novel and improved means for adjustably securing the grid member to the shank of a cultivator shovel whereby the grid member may be adjusted vertically and horizontally with respect to the cultivator shovel.

A further object of the present invention is to provide an adjustable cultivator shield that is quickly and readily applied to or removed from the shank of a cultivator shovel in a convenient manner.

A still further aim of the present invention is to provide an adjustable cultivator shield that is simple and practical in construction, strong and reliable in use, small and compact in structure, neat and attractive in appearance, efficient and durable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of a cultivator shovel and showing the present invention applied thereto;

Figure 2 is a top plan view of Figure 1;

Figure 3 is a perspective view of the attaching linkage used in conjunction with the present invention;

Figure 4 is a plan view of one type of clamp used in conjunction with the present invention; and Figure 5 is a perspective view of another type of clamp used in conjunction with the present invention.

Referring now to the drawings in detail, wherein, for the purpose of illustration, there is disclosed a preferred embodiment of the present invention, the numeral 10 represents a well-known type of shovel construction including an upwardly extending shank portion 12. The shovel construction forms a part of agricultural implements, such as those manufactured under the trade names "International," "John Deere," "Case," "Allis Chalmers," or "Ferguson."

The specific shovel constructions for the above referred to agricultural implements are slightly different. However, the present invention is adapted for use with all of the above agricultural implements as well as many other well-known agricultural implements not presently mentioned.

Heretofore, many types of guards or shields have been utilized in conjunction with the shovel constructions of farm implements. Some such shields were fixed adjacent the cultivator shovels in order to break up or screen large hunks or particles of dirt that were directed to the shields by the cultivator shovels.

The instant invention does not attempt to claim the broad use of a shield having the foregoing features but constitutes a novel and improved mounting means for the shield in order to adjust the shield vertically and horizontally with respect to the shovel construction, such as that represented by the numeral 10.

The shield employed in conjunction with the present invention includes an arcuate and tubular member 14 and a downwardly and rearwardly inclined bar 16. A plurality of spaced parallel rails or bars 18 are terminally secured to the member 14 and bar 16 and the lower of these bars is designated by the numeral 20 and constitutes a runner that will ride upon the ground, adjacent the shovel 10.

A parallelogram linkage is associated with the shield and includes a lower portion or link 22 that is terminally fixed to the upper ends of the member 14 and bar 16, and an upper portion or link 24 the ends of which are pivoted to the offset upper ends 26 and 28 of a pair of links or pitmans 30 and 32 through the medium of fasteners 34 and 36 that are received in a selected pair of a plurality of openings 38 in the upper link 24.

The upper link 24 is spaced parallel to the lower link 22 both longitudinally and laterally, and the lower ends of the pair of links 30 and 32 are pivoted to the lower link 22 by further fasteners 40 and 42.

The upper link 24 is provided with a central opening that receives a fastener or bolt and nut 44 and the vertical leg 46 of an angle member 48 is formed with a longitudinal slot 50 that receives the fastener 44. The horizontal leg 52 of the angle member 48 is also provided with a slot 54 that receives a bolt 56 having a nut thereon. The bolt 56 extends through one end of a connecting link 58 and the other end of the connecting link 58 is disposed between a pair of spaced arms 60 and 62 that are fixed to the web 64 of a U-shaped clamping member 66.

The arms 60 and 62 are provided with slots 68 that receive a fastener 70. The fastener 70 extends through the connecting link 58 and includes a nut that is adjustable to retain the link 58 adjusted between the ends of the arms 60 and 62 and toward or away from the clamping member.

The clamping member 66 embraces the shank 12 of the shovel 10 and is secured thereto in a selected vertical position by a bolt 72 that extends between the ends of the clamping member and which has a nut threaded thereon.

Figure 4 illustrates the clamping member in slightly modified form. In this embodiment, the clamping member 74 is substantially in the form of a split sleeve the ends 76 of which are turned outwardly in spaced relation and are connected by a fastener 78. The member 74 is secured by welding or the like to an arm of a pair of arms 80 that replace the arms 60 and 62.

The arms (or arm) 80 are slotted, as at 82, to receive the aforementioned fastener 70.

In Figure 5, the clamping member 84 is U-shaped and supports a single arm 86 having a slot 88. The ends of the member 84 are adjustably connected by any suitable fastening means, such as a bolt and nut.

The changes in shape and construction of the clamping member will permit the present invention to be applied to many types of shovel construction now in use.

In practical use of the present invention, by adjusting the fasteners 44, 56, 70 and 72, the shield may be raised, lowered or moved forwardly or rearwardly with respect to the shovel 10, and the links 30 and 32 will permit vertical raising and lowering movement of the shield as the rail 20 rides on the ground.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. In an agricultural implement including a cultivator shovel having a shank portion; a device for screening the dirt deflected by the shovel, said device comprising a grid member having a runner for riding upon the ground, a parallelogram linkage including upper and lower horizontal links, the lower link of said linkage being terminally fixed to said grid member and offset laterally from the upper link, means pivotally attaching said upper horizontal link to and offset from said lower horizontal link, a clamping member secured to said shank portion, a laterally projecting arm fixed to said clamping member, and means slidably and adjustably securing said arm to the upper link of said linkage.

2. A cultivator fender mounting comprising a horizontally disposed elongated link, a hanger arm pivoted to and depending from each end of said horizontal link for supporting a fender, an angle member having horizontal and vertical leg portions each of which includes an elongated slot, a fastener extending through the horizontal link and through the slot in the vertical leg portion of said angle member for adjusting the angle member vertically of the horizontal link, a clamping member adapted for mounting on a cultivator shank, a pair of parallel arms attached to and extending horizontally from the clamping member, a connecting link, a fastening member securing one end of said connecting link between said arms, and another fastening member slidably and adjustably securing the other end of said connecting link to the slot in the horizontal leg portion of said angle member.

3. The combination of claim 2 wherein said hanger arms include lower offset portions to permit raising of a fender supported on the lower portions of the hanger arms to be raised above the horizontal link.

EARNEST R. GUMM.

References Cited in the file of this patent

UNITED STATES PATENTS

| Number | Name | Date |
| --- | --- | --- |
| 1,016,814 | Carter | Feb. 6, 1912 |
| 1,525,575 | Fisher | Feb. 10, 1925 |
| 1,563,617 | Fones | Dec. 1, 1925 |
| 2,417,597 | Hill | Mar. 18, 1947 |